(12) United States Patent
Shepard

(10) Patent No.: US 11,465,680 B2
(45) Date of Patent: Oct. 11, 2022

(54) MULTIPLE STORED CONFIGURATION SENSORS

(71) Applicant: Daniel Robert Shepard, Stratham, NH (US)

(72) Inventor: Daniel Robert Shepard, Stratham, NH (US)

( * ) Notice: Subject to any disclaimer, the term of this patent is extended or adjusted under 35 U.S.C. 154(b) by 0 days.

(21) Appl. No.: 16/000,918

(22) Filed: Jun. 6, 2018

(65) Prior Publication Data

US 2018/0346025 A1 Dec. 6, 2018

Related U.S. Application Data

(60) Provisional application No. 62/515,644, filed on Jun. 6, 2017.

(51) Int. Cl.
| | |
|---|---|
| *B62D 13/06* | (2006.01) |
| *B62D 13/02* | (2006.01) |
| *B60D 1/06* | (2006.01) |
| *B60D 1/36* | (2006.01) |
| *G07C 5/00* | (2006.01) |
| *B60D 1/30* | (2006.01) |
| *B60D 1/24* | (2006.01) |
| *B60D 1/62* | (2006.01) |

(52) U.S. Cl.
CPC .............. *B62D 13/06* (2013.01); *B60D 1/06* (2013.01); *B60D 1/245* (2013.01); *B60D 1/30* (2013.01); *B60D 1/36* (2013.01); *B60D 1/62* (2013.01); *B62D 13/025* (2013.01); *G07C 5/008* (2013.01); *B60T 2230/06* (2013.01)

(58) Field of Classification Search
CPC . B60D 1/06; B60D 1/245; B60D 1/30; B60D 1/36; B60D 1/62; B62D 13/025; B62D 13/06; G07C 5/008; B60T 2230/06
See application file for complete search history.

(56) References Cited

U.S. PATENT DOCUMENTS

| | | | |
|---|---|---|---|
| 2,045,108 | A | 6/1936 | Smith |
| 2,061,326 | A | 11/1936 | Morse et al. |
| 3,833,928 | A | 9/1974 | Gavit et al. |
| 4,040,006 | A | 8/1977 | Kimmel |
| 4,122,390 | A | 10/1978 | Kollitz et al. |
| 4,322,670 | A | 3/1982 | Taylor |
| 5,523,947 | A | 8/1996 | Breen |
| 5,579,228 | A | 11/1996 | Kimbrough et al. |
| 5,831,519 | A | 11/1998 | Pedersen et al. |
| 5,905,433 | A | 5/1999 | Wortham |
| 5,999,091 | A | 12/1999 | Wortham |
| 6,388,579 | B1 | 5/2002 | Adcox et al. |
| 6,408,232 | B1 | 6/2002 | Cannon et al. |
| 6,806,809 | B2 | 10/2004 | Lee et al. |
| 6,982,656 | B1 | 1/2006 | Coppinger et al. |
| 7,715,953 | B2 | 5/2010 | Shepard |

(Continued)

FOREIGN PATENT DOCUMENTS

WO PCT/EP2014/058387 4/2014

*Primary Examiner* — Rachid Bendidi

(57) ABSTRACT

The present invention relates to entering data into a trailer backup guidance system. In particular, the present invention relates to storing data in the components of a trailer backup guidance system corresponding to a plurality of trailer and vehicle combinations to better facilitate sharing those components across a plurality of trailers and vehicles.

13 Claims, 3 Drawing Sheets

(56) References Cited

U.S. PATENT DOCUMENTS

| | | | |
|---|---|---|---|
| 7,990,286 | B2 | 8/2011 | Shankwitz et al. |
| 8,068,019 | B2 | 11/2011 | Bennie et al. |
| RE43,537 | E | 7/2012 | Davis |
| 9,037,349 | B2 | 5/2015 | Trombley et al. |
| 9,102,271 | B2 | 8/2015 | Trombley et al. |
| 9,132,856 | B2* | 9/2015 | Shepard ............... B62D 13/06 |
| 9,153,134 | B2* | 10/2015 | Warner ................. G08G 1/168 |
| 9,290,203 | B2 | 3/2016 | Lavoie et al. |
| 9,315,212 | B1 | 4/2016 | Kyrtsos et al. |
| 9,352,777 | B2 | 5/2016 | Lavoie et al. |
| 9,592,851 | B2* | 3/2017 | Lavoie .................. B62D 13/06 |
| 10,019,001 | B2* | 7/2018 | Dang Van Nhan .. G05D 1/0088 |
| 10,065,676 | B2 | 9/2018 | Bradley et al. |
| 2004/0083040 | A1 | 4/2004 | Parrott et al. |
| 2004/0215374 | A1* | 10/2004 | Shepard ................ B60D 1/58 |
| | | | 701/1 |
| 2009/0271078 | A1 | 10/2009 | Dickinson |
| 2010/0156667 | A1* | 6/2010 | Bennie ................ B60C 23/009 |
| | | | 340/902 |
| 2014/0303847 | A1* | 10/2014 | Lavoie .................. B62D 13/06 |
| | | | 701/41 |
| 2014/0343793 | A1* | 11/2014 | Lavoie .................. B62D 13/06 |
| | | | 701/41 |
| 2018/0043933 | A1* | 2/2018 | Hu ....................... G06K 9/4609 |
| 2018/0061239 | A1* | 3/2018 | Prasad ................ G06K 9/00791 |
| 2019/0009817 | A1 | 1/2019 | Bradley et al. |

\* cited by examiner

MULTIPLE STORED CONFIGURATION SENSORS

CROSS-REFERENCE TO RELATED APPLICATION

This Patent Application makes reference to and claims the benefit of U.S. Provisional Patent Application 62/515,644 by Shepard titled "MULTIPLE STORED CONFIGURATION SENSORS" that was filed on Jun. 6, 2017 and that application is incorporated herein in its entirety by reference; this Patent Application makes reference to U.S. Pat. No. 7,715,953 (the '953 patent) by Shepard titled "TRAILER BACKING UP DEVICE AND METHOD" which issued on May 11, 2010 and U.S. Pat. No. 9,132,856, by Shepard titled "TRAILER BACKING UP DEVICE AND TABLE BASED METHOD" that issued on Sep. 15, 2015 (the '856 patent) and U.S. Pat. No. 9,926,009, by Shepard titled "PORTABLE TRAILER GUIDANCE SYSTEM" that was filed on Jul. 3, 2015 and issued on Mar. 17, 2018 (the '009 patent) and U.S. patent application Ser. No. 15/275,386, by Shepard titled "IMU BASED HITCH ANGLE SENSING DEVICE" that was filed on Sep. 24, 2016 (the '386 application) and those patents and applications are each incorporated herein in their entirety by reference.

TECHNICAL FIELD

In various embodiments, the present invention relates to systems for guiding a trailer while backing and, in particular, the present invention relates to sensors wherein configurations are stored in a list for more than one application of that sensor.

BACKGROUND

Trailers have been around for many years, yet every summer and winter one can observe the owners of boats and snowmobiles, respectively, backing up those devices on trailers with great difficulty. The problem arises from the fact that a trailer being backed-up is an inherently unstable system. A trailer being pushed wants to turn around and be pulled (i.e., to jackknife) instead. To compensate for this instability, the driver must skillfully alternate the direction of his steering so as to cause the trailer to want to turn around and be pulled from opposite sides thereby repeatedly crossing the centerline of the pushing vehicle.

Various innovations have been introduced to address this problem in whole or in part. Prior art reveals several attempts to address the problems associated with backing a trailer. The simplest solutions address parts of the problem ranging from ways of sensing the angle of the hitch (see: Kollitz, U.S. Pat. No. 4,122,390), to sensing and displaying the angle of the hitch (see: Gavit, U.S. Pat. No. 3,833,928), to sounding an alarm when a jackknife condition exists or is imminent (see: Kimmel, U.S. Pat. No. 4,040,006). While these solutions are helpful, they only each address a part of the backing problem.

Various advanced solutions exist in the prior art. Some prior art trailer backup systems comprise having the tow vehicle operator steer the tow vehicle (see: Kimbrough, U.S. Pat. No. 5,579,228, or Shepard, U.S. Pat. No. 7,715,953). Others comprise tow vehicles that automatically control the steering of the vehicle (see: Shepard, the '953 patent or Trombley et al., U.S. Pat. No. 9,037,349). But, both approaches require that parameters relating to the components of the vehicle-trailer system being controlled are available to that system to perform calculations. The prior art reveals sensors in which parameters are stored where such parameter can be retrieved by the central system for system setup or configuration, such as a trailer mounted hitch sensor from which a parameter such as the length of the trailer on which the sensor is mounted can be retrieved (see: Shepard, the '953 patent). Other prior art reveals sensors in which an identification is stored and that can be retrieved by a central system and then used by that central system for parameter lookup in a database (see: Dickinson Pub. No. 2009/0271078 or Trombley et al., the '349 patent).

As demonstrated by the prior art, storing a parameter such as the trailer length in a controller located in or on the trailer is a long practiced approach. Kimbrough in his '228 patent taught: "On the trailer are located a steering controller/observer unit 6 . . . Parameters can be input into a controller/observer unit 6 when the vehicle system is initialized. . . . The steering variables are defined as: . . . s—the longitudinal distance from the trailer wheels to the trailer hitch" i.e., the trailer length, which is disclosed along with many other system parameters). In his U.S. Pat. No. 5,831,519, Pedersen teaches that a " . . . transported unit or units have a tag capable of receiving or transmitting instructions or information from the data processing unit via another aerial which is also located on the transported unit, the transported unit can advantageously provide information on its position. . . . Similarly, the data processing facilities in the towing unit can write to and read from the same tag via an aerial on the transporting unit . . . " Shepard in his '953 patent teaches "The calculations require that certain measurements of the vehicle-trailer system are known and/or have been input into the system including the wheelbase, the hitch length, and the trailer length. . . . Furthermore, the angle sensing module could be preprogrammed with other data; for example, the hitch angle sensor module could be sold as a matched unit with a trailer in which case the hitch angle module could come preprogrammed with the length of that trailer and enable the central microcomputer to query that module for this additional data value rather than require the operator to have to enter the data during a configuration process or when a different trailer is being backed up."

Alternatively, the prior art also teaches having data relating to a trailer be stored in a central location (i.e., a database). Wortham in his U.S. Pat. 5,999,091 teaches a system with a wireless tag in or on a trailer that "functions to generate, collect, receive, store, process, and/or transmit information relating to the trailer on which it is located" along with a tag reader unit that "may be carried on board any vehicle operable to transport one or more trailers, including tractors" and that "includes communicating a variety of information at a trailer. This information may include trailer identification, status, alarm, and control information, all of which can be transmitted to or received from a central host or a network services center (NSC)." Wortham further taught the automatic recognition of a trailer in that communication with a tag unit "can be initiated upon the occurrence of any of a number of predetermined activating events. . . . Exemplary activating events include a synchronization event, . . . A synchronization event may comprise any event which occurs substantially simultaneously on both trailer 12 and a vehicle to which such trailer is connected, such as a tractor 30. A synchronization event can be supported by a standard seven-pin connector 36 between a trailer 12 and a tractor 30. . . . The synchronization event may comprise . . . the coupling/decoupling of the trailer end of a seven-pin connector 36 to/from the vehicle end of the connector." In other words, coupling the trailer's connector to the tow vehicle is an event that activates the system. Dickinson in his published Application for Patent 2009/0271078 titled "System and Method for Identifying a Trailer Being Towed by a Vehicle" taught detecting the presence of a trailer with a video camera in the tow vehicle, identifying the trailer by its estimated area and shape, and then from that identification, looking up parameters of the trailer in a database. Bennie in his U.S. Pat. No. 8,068,019 teaches wirelessly and automatically identifying a trailer connected to a tow vehicle and includes comparing the sensor identification in the transmitted signal to known sensor identifications stored in a database; identifying a trailer configuration stored in the controller and associated with the known sensor identifications; and collecting and storing data relevant to the identified trailer in the trailer configuration. However, this solution requires that the central system (e.g., the tow vehicle located controller) must, in advance of being connected to the trailer, have data corresponding to that trailer in its database to pair with the identification in the signal transmitted by the trailer unit in order to find and utilize that trailer data; otherwise, a first time coupling with a trailer will require manual input of data for that trailer during a setup operation for that vehicle-trailer combination.

A trailer guidance systems disclosed in U.S. patent application Ser. No. 14/791,283, and now issued as U.S. Pat No. 9,926,009, by Shepard titled "PORTABLE TRAILER GUIDANCE SYSTEM" that was filed on Jul. 3, 2015 teaches portable sensors for detecting the hitch angle and the turning radius of the tow vehicle and output means for displaying the intended trailer destination. Many vehicles do not have integral turning sensors and most trailers and/or hitches do not have integral hitch angle sensors. The solution taught by the '009 patent is to make a steering sensor that can be strapped to a steering wheel to measure the rotation of that steering wheel from which the turning radius can be determined and a hitch sensor that can be attached to an existing vehicle and trailer to measure the hitch angle. However, with such portable sensors, it is likely that a user of the system will want to use that system with more than one vehicle and/or with more than one trailer. For example, the user of such a system might own two or more tow vehicles or two or more trailers. In such cases, the user may transfer the steer sensor from a first tow vehicle to a second tow vehicle or from a first trailer to a second trailer. Whenever such a steering sensor or hitch angle sensor is moved to a different vehicle or trailer, the new parameters such as wheelbase or trailer length must be reentered or reprogrammed. It would be desirable for the parameters associated with the second vehicle or second trailer to already be programmed into the sensor.

What is needed is a steer sensor that can remember the parameters of more than one vehicle and/or a hitch sensor that can remember the parameters of more than one trailer so that these sensors can be moved from vehicle to vehicle or from trailer to trailer without the need for reentry of data. In this way, a given sensor can be installed on one of a number of vehicles or trailers and the parameters be made available. For ease of use, each configuration stored in a given sensor is labeled so that an operator can more easily identify a given parameter set, and a given parameter set selection should be retained in non-volatile storage so that once a sensor is installed in a vehicle or on a trailer, that parameter set will become the default parameter set until the sensor is yet again moved. In addition, for optimal operation, the steer sensor and the trailer sensor in use in a particular installation may want to share or exchange one or more data items such that the two sensors will automatically operate cooperatively.

SUMMARY

The present invention relates to configuration data stored in a sensor of a trailer backup guidance system, and in particular, for configuration data stored for more than one setup for that sensor of a trailer backup guidance system. As shown in FIG. 3, for such a system 300 to operate as described in the '953 patent, the wheelbase 309 of the vehicle 301 and the length 310 of the trailer 302 must be known to the system. However, the the '009 patent introduced portable sensors that can be shared among several installations of the system.

It is an objective of the present invention that data entered for system operation (i.e., a parameter set) is stored in the sensor and then a label is applied to that data by the user to enable recognition of that entered data. Using teachings from the '386 application whereby a vehicle based sensor 101 and a trailer based sensor 200 can determine the angle of articulation at the hitch ball 307 (i.e., the hitch angle), the system will naturally want to store certain data relevant to the function performed by that sensor in that sensor.

In addition to these input values, the trailer backup guidance system described in the above patents or patent applications, and in particular as described in the '009 patent, requires the user to select a wireless connection to the steer sensor and, in most cases, to the hitch sensor. However, when the system is used and a connection to a sensor is to be made, it is preferable that a list of available sensors will show a name recognizable to the user. For example, a Bluetooth based link can uniquely identify a steer sensor by its MAC address, but a user will not typically know what this MAC address is. It is an objective of the present invention that the user can assign a name to a particular configuration stored within the sensor for easier recognition during system use. It is an objective of the present invention that one sensor configuration can include wireless connection parameters to connect to another sensor. It is an objective of the present invention that the user can optionally also assign a name to the sensor itself for easier recognition during system use.

It is also an objective of the present invention to simplify the sharing of sensors across a plurality of system set-ups.

Finally, it is an objective of the present invention to input heading data for a backing up target for the trailer such that the trailer will know the heading for its intended destination (such as a frequently used boat ramp) to facilitate backing up in the intended direction once the trailer is directed at that destination. A plurality of such backing up targets for the trailer can be labeled and stored in a trailer sensor; any one or more of these backing up targets can be associated with a set of parameter input values.

BRIEF DESCRIPTION OF THE DRAWINGS

The drawings herein are not necessarily to scale as emphasis instead generally being placed upon illustrating the principles of the invention. In the following description, various embodiments of the present invention are described with reference to the following drawing, in which.

DETAILED DESCRIPTION

The present invention relates to systems for guiding a trailer while backing and in particular to entering, storing, and retrieving data and parameters for systems operating in the guidance of a trailer while backing.

Figure 5:
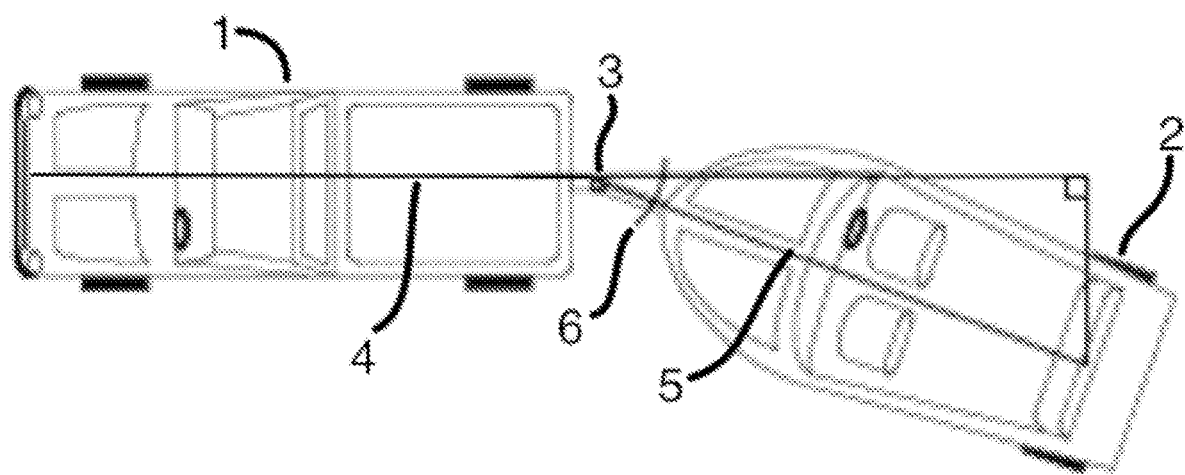
FIG. 5 depicts centerlines for a vehicle and a trailer and an angle formed therefrom.

A trailer backup system is used for backing up a trailer, 2, when, as is shown in FIG. 5, the trailer is connected to a vehicle, 1, by an articulated joint, 3 (e.g., by a hitch ball mounted on a hitch and trailer coupler mounted on a trailer tongue), the articulated joint having an angle (the hitch angle, 6) formed by the intersection of a line, 4, parallel with the centerline of the vehicle and a line, 5, parallel with the centerline of the trailer. In operation, a trailer backup system will have values that are measured during operation and values that must be input into the system before that system can be operated. These input values are typically specific to the vehicle and trailer being used. Once input, the values are stored in the memory of the system, and in particular for greatest convenience, into the non-volatile memory of the system. When a trailer sensor is mounted on a particular trailer and loaded with the data relevant to that trailer, any appropriately equipped vehicle can connect (either through connection with the trailer's wiring harness, with a separate wiring connection, or with a wireless connection) to that trailer and use the values already stored in the controller or sensor attached to that trailer. Likewise, when a steering sensor is mounted on the steering wheel of a particular vehicle loaded with the data relevant to that vehicle, any appropriately equipped trailer can be connected (typically with a wireless connection so as to not entangle wires about the steering column, though not to rule out a wired connection) to that vehicle for the system to use the values already stored in that steering sensor.

In this way, a user of the system would not have to reenter any configuration data into that system, but these various components of the system could be queried to retrieve the needed data. This is the approach used in many of the prior art disclosures. However, if the user of the system were to remove that sensor from one trailer (e.g., from a boat trailer) and attach it to a different trailer (e.g., to a camper trailer), the parameters for the new trailer would have to be entered (e.g., the length of the new trailer). With the prior art solutions, this data entry would typically need to occur whenever the sensor was moved and the newly entered parameter or parameters would overwrite the prior configuration values in the non-volatile memory of that sensor or controller. This occurs because there is only a single instance of the variables in the computer's programming for holding those data values.

The present invention comprises a plurality of storage locations or potential storage locations for each variable in the computer's programming for holding those data values whereby an index value is then used to select one variable storage location over another. These variables include the parameter values needed for operation as well as a string for holding a user-supplied name. For each index value, there is a set of values that have been stored for configuration of the system or part of the system (i.e., the part corresponding to the vehicle or trailer). During typical operation, the index value does not change and parameter values can be entered, updated or retrieved as is done in the prior art. However, special commands are additionally provided to increment or decrement the index value (with appropriate handling for wrapping at the ends of the list of available sets of values, growing or shrinking the number of sets of values in the list, etc. as is well understood by those skilled in the art of computer software design). When the index value is changed, only the corresponding set of values is accessible (including the corresponding user-supplied name string to identify that set of values). The sets of values can be structured to exist in individual vectors for each variable, in a vector of data structures, in a vector of pointers to data structures, in objects, linked lists, or a variety of ways known to those skilled in the art of computer software design.

Figure 1:
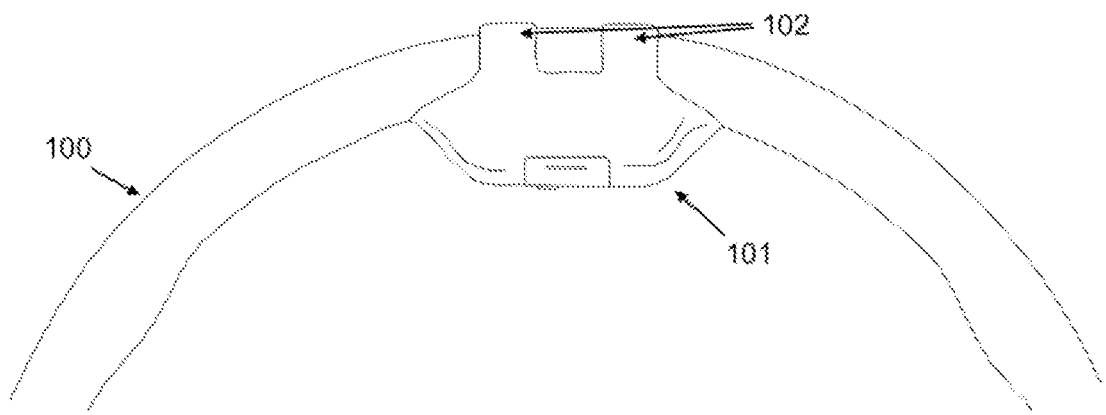
FIG. 1 depicts a steering wheel sensor in accordance with one embodiment of the invention.
Figure 2:
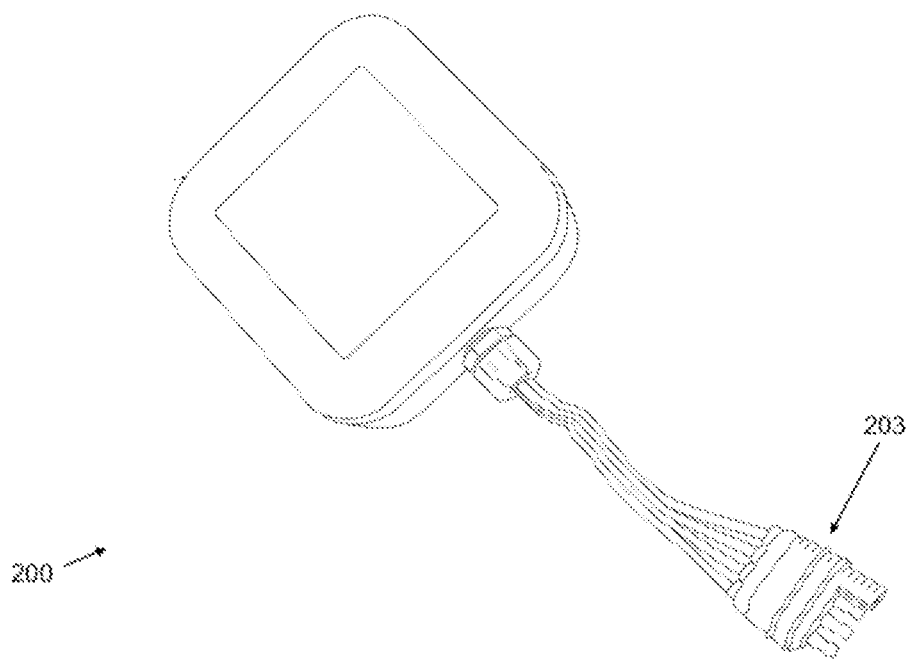
FIG. 2 depicts a hitch angle sensor in accordance with one embodiment of the invention.

FIG. 1 illustrates the top portion of a steering wheel 100 on which a steering sensor 101 has been attached using straps 102. FIG. 2 illustrates a trailer based sensor 200 for attachment to a trailer having a connector 203 to connect the sensor 200 into the wiring harness for that trailer. These sensors will have non-volatile storage in which configuration or parameter data is stored. Steering sensor 101 and trailer sensor 200 contain one or more electronic, mechanical, or electromechanical devices for determining parameters relevant to computing the path for the trailer. These sensors incorporate a computing device such as a microprocessor or a microcomputer that is wired to or incorporates one or more information storage devices (i.e., electronic memory devices) whereby the memory devices include a portion of non-volatile memory capable of retaining stored contents when power is removed (or low power memory or memory that can be put into a low power mode that can retain their contents when power is reduced to a standby level). This non-volatile (or low power) memory is used to store data elements corresponding to a particular vehicle and trailer combination and/or various system data values or heading values for predetermined paths.

It should be noted that the sensing mechanisms of the sensors are not limited to those described herein. A variety of sensors can likewise be utilized to accomplish the desired purpose of the sensors described without detracting from the teachings of the present invention. For example, a hitch sensor having a magnetic rotation sensor (such as described in U.S. Pat. No. 9,926,009) can be utilized rather than the IMU based sensor described herein.

One of the easier values to find for a vehicle is the wheelbase—it is found in the owner's manual of almost every vehicle. Other possible vehicle related parameters include the tilt angle of the steering wheel, the wheel lock (maximum steering angle), steering ratio (or it's inverse), hitch length, units of measure (as a string or as an identifier code; e.g., "feet", "inches", "centimeters", 0×01 hex code, "degrees", "radians", etc.) among others. The length of a trailer is easily ascertained by using a measuring tape. Other possible trailer related parameters include number of axles, distance between axles (if more than one), tongue length, and units of measure, among others. Any or all of these values can be input into the system by the user. The user could also enter a name for the set of data parameters. For example, the trailer for a sailboat might be named "Dad's sailboat" and thereafter, when that sensor is attached to that sailboat trailer, those parameters can be called up by selecting that name.

Figure 4:
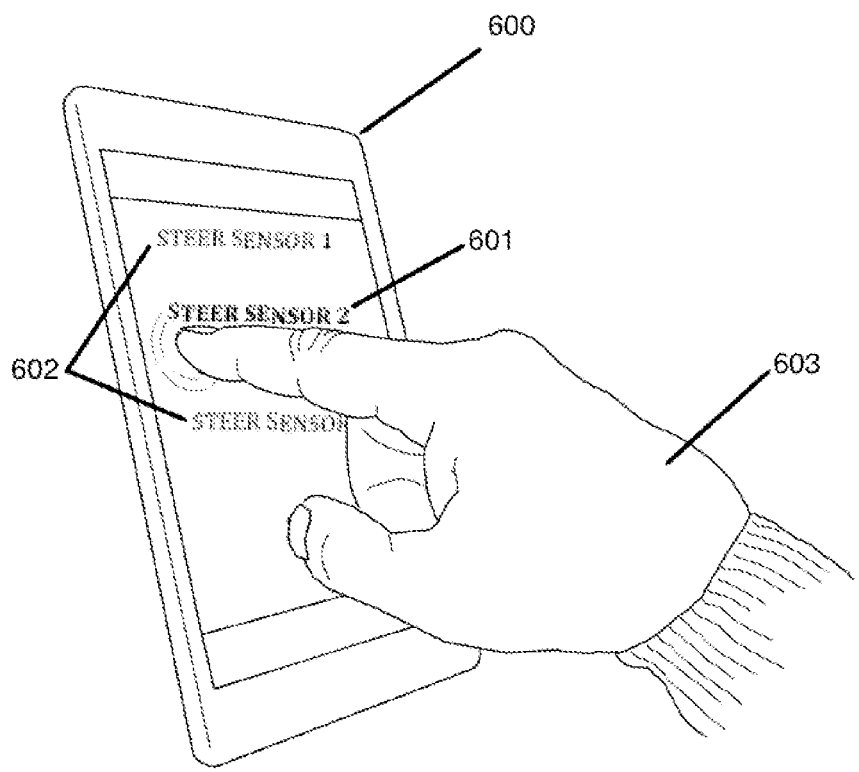
FIG. 4 depicts a display screen showing selection of a data set in a sensor in accordance with one embodiment of the invention.

When more than one set of data parameters are stored in a sensor device, a command is sent to that sensor device to select a particular parameter set as described above. Alternatively, as depicted in FIG. 4, a command could be sent to the sensor device to retrieve the list of data set names 602 to be displayed on the inputting device 600. This list could be stored in non-volatile memory in the displaying or inputting device. This list could be stored in non-volatile memory in the displaying or inputting device, but could also be simply stored in volatile memory for the duration of a data set selection action by an operator or until powered off (non-volatile memory can have a limited number of write actions available to it, so this approach reduces wear on that non-volatile memory). Once the operator 603 makes a data set selection 601, a command is sent to the sensor device to inform it of that data set selection, the sensor device updates its selection mechanism (e.g., an index pointer variable value), the sensor device optionally confirms receipt of the command and/or the successful processing of that command, and the displaying or inputting device can then release or clear the memory associated with that list of data set names.

In addition to values such as trailer length, wheelbase, steering ratio, hitch length, etc., the trailer backup guidance system described in the above patent or patent applications, and in particular as described in the '009 patent, requires the user to also select a wireless connection to a steer sensor and, in most cases, to a hitch sensor if not a wired connection. Wireless connection information about the sensors or other devices last connected to wirelessly (e.g., if a Bluetooth connection, may include the MAC address, UUID, sensor name, etc.) is also contemplated among values to be saved according to the present invention. It is further contemplated by the present invention that a given sensor could retain in a stored data set or in its non-volatile memory, data about the last device connected to in order to more quickly reestablish operations if the communications connection is temporarily lost or if the system is resumes operation after a period of non-use.

Figure 3:
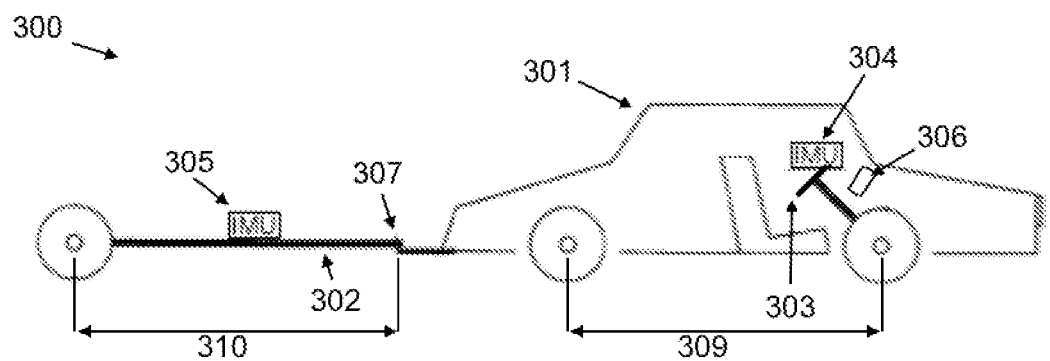
FIG. 3 depicts the trailer backup system in accordance with one embodiment of the invention.

A display 306 to interact with a steer sensor 304 and hitch sensor 305 is a necessary part of a trailer backup guidance system 300 (see FIG. 3). Typically, this display is a hand-held or a portable device (such as a PDA, a smart phone like an iPhone, or a tablet like an iPad, or some other portable or mobile device such as a laptop computer or a portable computing device) that is wirelessly connected to one or more of the trailer backup system sensors. For a wireless display device, the wireless link could be affected using WiFi, Bluetooth, ZigBee, or any of a number of commercially available wireless protocols or a proprietary protocol using the same or other radio, visible light, invisible light communications. The displaying and data inputting mechanism could also be part of or built into an onboard computing system built into or installed in the vehicle.

The display component will communicate with other components of the system such as the hitch sensor (i.e., electronics proximate to the hitch to contribute to the determination of the hitch angle), the steering sensor (i.e., electronics proximate to the steering to contribute to the determination of the turning radius of the vehicle), or other electronics or computing components for performing calculations or otherwise contributing to the determination of the trailer's predicted direction. For components to become connected, they identify each other wirelessly and form an association. Once the communication links are formed, guidance can commence. Any data variable associated with such link formation can be among the values stored in a given sensor.

When the system is used in close proximity with other users using the same system or parts of the same system (e.g., if another trailer equipped with a hitch sensor is in close proximity to the trailer being towed), it can be difficult to identify the intended sensor. By having the link formation variables stored in one or more sensors, a particular sensor can be more readily identified from a list of sensors on a display unit 306 (e.g., a PDA, smartphone, tablet, lap top computer, or a mobile device or the equivalent) that is in communication with that or those sensors.

Finally, it is an objective of the present invention to input heading data for a backing up target for the trailer such that the trailer will know the heading to its intended destination (such as a frequently used boat ramp) to facilitate backing up in the intended direction once the trailer is directed at that destination. A plurality of such backing up targets for the trailer can be labeled and stored in a trailer sensor; any one or more of these backing up target headings can also be associated with a set of parameter input values. Alternatively, a plurality of such backing up targets for the trailer can be labeled and stored in the display device (e.g., a tablet, lap-top computer, PDA, smart phone or other portable device or in an onboard computing system built into or installed in the vehicle).

A heading can be measured either relative to a frame of reference that is fixed to the earth (e.g., a gravity-down, north-forward, east-right frame) or a frame of reference that is fixed to either the trailer or to the tow vehicle. In this way, the desired heading (i.e., an intended direction for the trailer) is made known to the system and the difference between this desired heading and the actual heading can be used to compute a path adjustment. When combined with the teachings of the '856 patent and the '386 application, the hitch angle and the turning radius are used to compute a predicted direction; this predicted direction and its corresponding heading is then compared to the desired heading to determine if the turning radius (and its corresponding position of the steering wheel) should be increased or decreased (and if the corresponding position of the steering wheel should be decreased or increased, respectively) to cause the predicted heading and the desired heading to be generally the same. By determining the trailer's current heading or the vehicle's current heading according to the teachings of the '386 application, and determining the angular difference between that and the desired heading for the trailer, that angular difference can be used as if it were the predicted change in direction according to the '856 patent to use the table lookup method disclosed therein in reverse to find a turning radius corresponding to the current hitch angle. This turning radius can then be used to determine the corresponding position of the steering wheel to inform the driver via the display device (or to provide a steering value to automatic driving equipment) of how much and in which direction to turn the wheel (or in what rotational position the wheel should be). Such a feature can be helpful along any path, but is particularly helpful when backing in a straight line.

The '953 patent teaches having an input mechanism, such as a button to be pressed, when the vehicle and trailer are aligned and pointing in the direction of an intended target to indicate to the backup guidance system the direction to be maintained to reach that target destination. It is an aspect of the present invention that a similar input mechanism can be used to indicate that the trailer is pointing in the direction of an intended target (regardless of the alignment with the vehicle to the trailer) to indicate a desired trailer heading. Alternatively, the desired heading can be input numerically from a paper map or retrieved from a database. Once provided to the system, whether input or determined by the system, this heading data can be stored in the sensor as described previously. Whether stored in the sensor or having just been determined by one of the various input mechanisms, a trailer guidance system can use this heading data to determine a steering position corresponding to the heading data and the current hitch angle, as described above; this steering position can be provided as either an absolute steering position or as a position relative to the current steering.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive.

I claim:

1. A portable sensor device for use with a system for backing up a trailer that is selected from a population of one or more trailers and that is connected to a vehicle selected from a population of one or more vehicles, the trailer and the vehicle forming a trailer and vehicle pair that is connected by an articulated joint, the articulated joint having an angle that is formed by a first line parallel to a centerline of the vehicle and a second line parallel to a centerline of the trailer with the angle being found at a point where the first and second lines intersect, the portable sensor device comprising:

(A) a sensing device selected from the list of (a) a magnetic sensing device, (b) an inertial sensing device, (c) a steering wheel rotation sensing device, and (d) a hitch angle sensing device;
(B) a computing device;
(C) one or more information storage devices that are in communication with the computing device and that comprise a portion of non-volatile storage, wherein the portion of non-volatile storage comprises a plurality of data collections stored within, where a data collection corresponds to one of a trailer and a vehicle from a trailer and vehicle pair and comprises one or more data values from a list of possible data values comprising (i) a wheelbase of the vehicle, (ii) a ratio of the turning of the steering wheel to the turning of the wheels of the vehicle, (iii) a wheelbase of the vehicle measured in units of trailer length, (iv) a length of the trailer, (v) a communication link's address or ID, (vi) a heading for the trailer, (vii) a heading for the vehicle, (viii) a length of a hitch, (ix) an indication of units of measure, (x) an index, and (xi) a label;
(D) a selected data collection that is selected from the plurality of data collections;
wherein the computing device is programmed to perform a computation that yields a result comprising one or more of (1) a turning radius, (2) the trailer's predicted direction, (3) the angle of articulation at the hitch ball, (4) the rotation of the steering wheel, and that is used to determine a path to be followed while backing up the trailer and vehicle pair, and wherein the computation is performed using one or more values from a selected data collection and a value measured by the sensing device that is mounted on the trailer and vehicle pair, and wherein the sensor device communicates with a display device that displays a list of the plurality of data collections comprised by the portion of non-volatile storage, where an operator selects at least one data collection that corresponds to the trailer and vehicle pair on which the portable sensor device is mounted, where the operator is able to update a value corresponding to the trailer and vehicle pair on which the portable sensor device is mounted for one of the data values in the list of possible data values, and where the portable sensor device communicates with the display device one or more of the data values from the selected data collection and the computation that yields a result.

2. The portable sensor device of claim 1 where the path for the trailer is presented at the display device using the computation that yields a result.

3. The portable sensor device of claim 1 where the data collection is identifiable by the label data value.

4. The portable sensor device of claim 1 where the display device is comprised by the list of a tablet, a lap-top computer, a PDA, a smart phone, a portable device, or an onboard computing system built into or installed in the vehicle.

5. The portable sensor device of claim 3 where the portable sensor device transmits to the display device, in response to a command from the display device, the label data values from the plurality of data collections.

6. The portable sensor device of claim 1 where the selection of a vehicle or of a trailer is made by (i) sending identifying information to the display device from the portable sensor device, (ii) presenting to the operator a list on the display device comprising identifying information sent to the display device from the portable sensor device, (ii) the operator making a selection from the list, and (iii) the display device sending a command to the portable sensor device indicating the selection made by the operator.

7. The portable sensor device of claim 1 where information corresponding to more than one data collection is sent to the display device.

8. The portable sensor device of claim 7 where the information corresponding to more than one data collection is stored in volatile memory at the display device.

9. The portable sensor device of claim 8 where the selection of a trailer from the population of one or more trailers or the selection of a vehicle from the population of one or more vehicles is made at the display device using the information corresponding to more than one data collection.

10. The portable sensor device of claim 9 where a command representing the selection is sent from the display device to the portable sensor device.

11. The portable sensor device of claim 10 where a confirmation or acknowledgement is sent to the display device by the portable sensor device.

12. The portable sensor device of claim 1 where communicating a data value between the portable sensor device and the display device is made over a wired connection or wirelessly.

13. The portable sensor device of claim 1 where the data collection is identifiable by the index data value.

* * * * *